United States Patent

[11] 3,582,686

[72] Inventor Carroll R. Perkins
Balboa Island, Calif.
[21] Appl. No. 885,516
[22] Filed Dec. 16, 1969
[45] Patented June 1, 1971
[73] Assignee Hughes Aircraft Company
Culver City, Calif.

[54] RESET CIRCUIT FOR A MULTISTAGE COUNTER
3 Claims, 2 Drawing Figs.

[52] U.S. Cl. 307/269, 307/221, 307/224, 307/304, 328/48
[51] Int. Cl. H03k 17/00
[50] Field of Search 307/221, 224, 269, 304; 328/42, 48

[56] References Cited
UNITED STATES PATENTS

| | | | |
|---|---|---|---|
| 3,252,009 | 5/1966 | Weimer | 307/224X |
| 3,395,292 | 7/1968 | Bogert | 307/304X |
| 3,406,346 | 10/1968 | Wanlass | 328/37 |
| 3,483,400 | 12/1969 | Washizuka et al. | 307/221X |

*Primary Examiner*—Donald D. Forrer
*Assistant Examiner*—R. C. Woodbridge
*Attorneys*—James K. Haskell and Paul M. Coble

ABSTRACT: A reset circuit for a multistage counter of the type clockable by clock pulses, successively applied on two clock lines, includes two MOS FET's which, when rendered conductive by the application of an appropriate potential to their gate electrodes, effectively electrically connect the clock lines to a potential supplying terminal, thereby applying a clocking potential to the lines. The circuit includes a third MOS FET, which is used to apply a logic 0 level to the input terminal of the first counter stage. The respective gate electrodes of the three MOS FET's are connected to a reset line so that a reset pulse on this line activates the three MOS FET's.

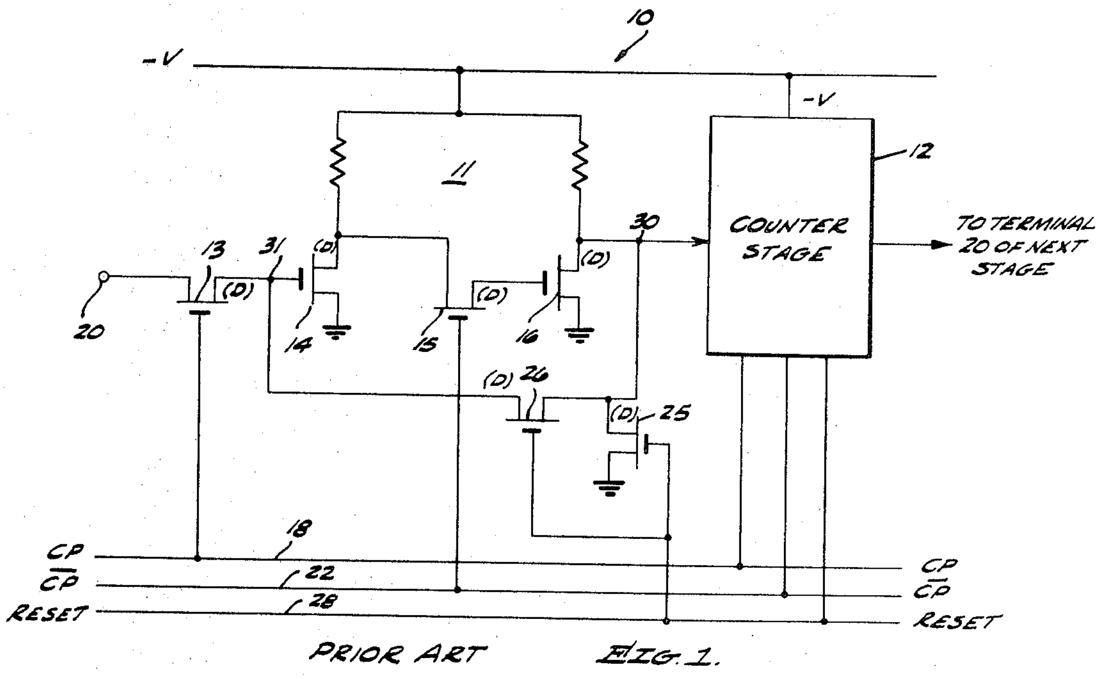
PRIOR ART FIG. 1.
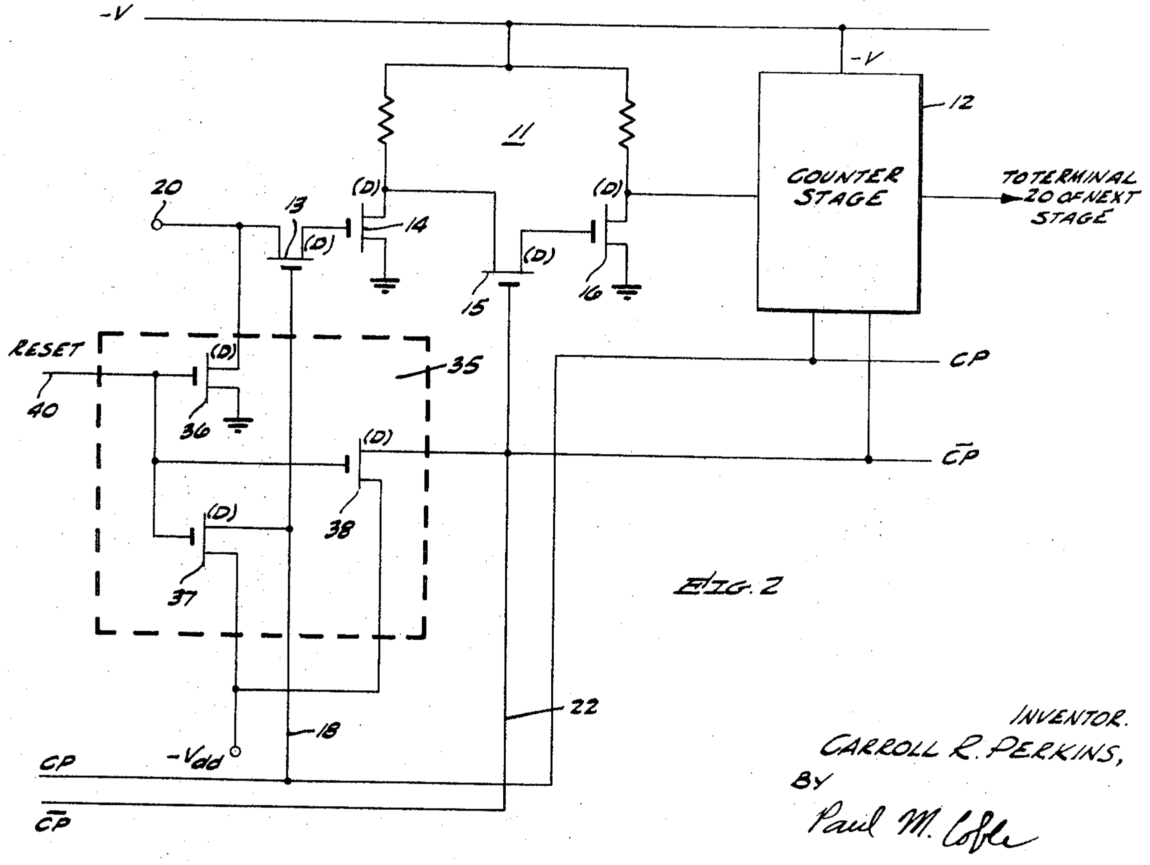
FIG. 2
INVENTOR.
CARROLL R. PERKINS,
BY
Paul M. Coble
ATTORNEY.

RESET CIRCUIT FOR A MULTISTAGE COUNTER

FIELD OF THE INVENTION

The present invention relates to multistage digital circuitry and, more particularly, to a novel reset circuit for a multistage shift register or counter, employing metal oxide semiconductor field effect transistors, known as MOS FET's.

DESCRIPTION OF THE PRIOR ART

MOS FET's, hereafter referred to as MOS elements, are extensively employed in various digital integrated circuits and systems. Among such circuits are multistage digital shift registers, some of which are connected to operate as multistage counters. Typically, in such a counter each stage is of the master-slave type. That is, the stage includes a master section into which data or information is transferred from a preceding stage when the stage is clocked by a clock pulse, CP. Then, the complement of CP, designated $\overline{CP}$, is applied to the stage, causing the data to be transferred from the master to the slave section. Such a stage includes at least four MOS elements for data transferring purposes.

Each stage generally includes two additional MOS elements which are used for stage resetting. Thus, a third of the number of MOS elements in each stage consists of elements used for resetting purposes only. This represents a significant disadvantage, particularly in counters which include large numbers of stages, since the resetting MOS elements substantially increase the complexity and size of the final circuit. Thus, a need exists for a new arrangement for resetting all of the stages of a long counter or shift register with a minimum number of MOS elements.

OBJECTS AND SUMMARY OF THE INVENTION

It is a primary object of the present invention to provide a new, improved resettable counter of the type employing MOS elements.

Another object of the present invention is to provide a novel arrangement for resetting a multistage counter in which each stage consists of a master section and a slave section.

A further object of the present invention is to provide a new, very simple arrangement for resetting a multistage counter, in which each stage consists of MOS elements, with a minimum number of MOS elements, the number of elements being independent of the number of stages.

A resetting arrangement in accordance with the invention is adapted for use in combination with a multistage counter in which each stage is successively clockable by a first clock pulse supplied on a first clock line and by a second clock pulse supplied on a second clock line, so as to shift binary data from one stage section to the next stage section and from one stage to the next succeeding stage. The resetting arrangement includes first and second metal oxide semiconductor field effect transistors, each having a first electrode, a second electrode, and a control electrode. The respective first electrodes of the first and second transistors are connected to the first and second clock lines, respectively. There is applied to the second electrode of each transistor a potential level which, when applied to the clock lines, results in the clocking of the counter stages so as to shift data therein. When a reset pulse is applied to the respective control electrodes of the first and second transistors, these transistors are rendered conductive of current to effectively apply the aforementioned potential level to the first and second clock lines.

Additional objects, advantages and characteristic features of the present invention will become apparent from the following detailed description of a preferred embodiment of the invention when considered in conjunction with the accompanying drawings. BRIEF DESCRIPTION OF THE DRAWINGS FIG. 1 is a schematic and block diagram illustrating a prior art multistage counter having separate resetting MOS elements in each stage; and FIG. 2 is a schematic and block diagram illustrating a resetting arrangement according to a preferred embodiment of the present invention.

DESCRIPTION OF A PREFERRED EMBODIMENT

In FIG. 1, numeral 10 designates a prior art multistage counter which for simplicity, is shown as comprising two stages, 11 and 12. Only stage 11, which is assumed to be the first stage, is schematically diagrammed. Each other stage is assumed to be identical to stage 11. Basically, the stage 11 includes four MOS elements 13—16. MOS element 13, whose gate electrode is connected to a clocking line 18 at which clock pulses (CP's) are applied, is rendered conductive by a CP. When MOS element 13 is conductive, it applies the voltage level at an input terminal 20 to the gate electrode of MOS element 14, which serves as the stage's master section. The latter dynamically stores the complement of the input voltage level representing the input data.

MOS elements 15 and 16 are analogous with elements 13 and 14, respectively. Element 15 is rendered conductive by a $\overline{CP}$ which is applied to its gate electrode via a clocking line 22. When MOS element 15 s conductive the voltage level at the drain (D) electrode of element 14 is transferred to the gate electrode of element 16, the drain electrode of which provides the stage's output and is connected to the input terminal of the next stage 12.

In addition to the aforedescribed MOS elements, each stage includes a pair of MOS elements 25 and 26 which are used for resetting the stage. The MOS elements 25 and 26 have their gate electrodes connected to a reset line 28, to which a reset pulse is applied when the counter 10 is to be reset. The drain electrode of MOS element 25 and the source electrode of MOS element 26 are connected to the stage output terminal 30. The source electrode of MOS element 25 is connected to ground, while the drain electrode of element 26 is connected to the gate electrode of MOS element 14, i.e. to stage reset terminal 31.

In operation, a reset pulse on line 28 renders MOS elements 25 and 26 conductive. Consequently, the stage output terminal 30 is essentially grounded through MOS element 25, while the reset terminal 31 is essentially grounded through serially connected MOS elements 26 and 25. When the terminals 31 and 30 are grounded, a logic O is entered into the stage.

The aforedescribed resetting arrangement requires two MOS elements (25 and 26) for each counter stage. Clearly, as the number of stages increases the number of MOS elements needed for resetting purposes increases, thereby increasing the complexity and cost of the counter. These disadvantages are eliminated by the novel resetting arrangement of the present invention which is now described in connection with FIG. 2 in which components similar to those previously described are designated by the same reference numerals as their counterpart components.

In FIG. 2, numeral 35 designates a reset unit which consists of only three MOS elements 36, 37 and 38. Unit 35 is capable of resetting all of the stages of the counter, regardless of the number of stages. Basically, the gate electrode of each of the MOS elements 36, 37 and 38 is connected to a reset line 40 on which a reset pulse is present when the counter is to be reset. The drain (D) electrodes of the elements 36, 37 and 38 are connected respectively to the stage input terminal 20, the CP line 18, and the $\overline{CP}$ line 22. The source electrode of MOS element 36 is connected to ground, while the respective source electrodes of the MOS elements 37 and 38 are connected to a terminal supplying a negative potential, designated $-V_{dd}$.

In operation, when a reset pulse is applied to line 40 the MOS elements 36, 37 and 38 are rendered conductive. MOS element 36 effectively electrically connects terminal 20 to ground, thereby applying a logic 0 to the input to stage 11, while MOS elements 37 and 38, respectively, effectively electrically connect the clocking lines 18 and 22 to the $-V_{dd}$ terminal. Consequently, the respective gate electrodes of the MOS elements 13 and 15 of all of the counter stages are activated with the potential $-V_{dd}$ to render all of the elements 13 and 15 conductive and enable the dynamic transfer of data from each master section to the slave section of the same stage, while transferring the data from each slave section to the master section of the next stage. Alternately stated, when MOS elements 13 and 15 of all of the stages are conductive simultaneously, the data or logic level at the input terminal 20 propagates down the counter from each stage to the succeeding stage. Since the activation of MOS element 36 applies a logic 0 to input terminal 20 of the first stage 11, a logic 0 propagates down the counter as long as the potential $-V_{dd}$ is applied to the clocking lines 18 and 22 (or when subsequent clock pulses CP and $\overline{CP}$ are applied to the respective lines 18 and 22), thereby resetting the counter to an all 0 state.

It should be appreciated that reset unit 35 is not included in each counter stage. Rather, unit 35 serves all of the stages of the counter since it accomplishes the resetting of the stages by effectively connecting the clocking lines 18 and 22, to which all of the stages are connected, to the $-V_{dd}$ terminal. Thus, in accordance with the present invention, only three MOS elements are needed to reset all of the counter stages. Three MOS elements, as compared with the large number of such elements required in any relatively long counter of the prior art, represent a very significant reduction in the number of MOS elements needed for resetting purposes. Thus, by incorporating the present invention in a multistage counter which employs MOS elements, a significant reduction in the size and complexity of the counter is realized.

Although a particular embodiment of the invention has been described and illustrated herein, modifications and variations which are obvious to those skilled in the art to which the invention pertains are deemed to be within the purview of the invention.

What is claimed is:

1. In combination with a multistage counter in which each stage is successively clockable by a first clock pulse supplied thereto on a first clock line and by a second clock pulse supplied thereto on a second clock line, so as to shift binary data from one stage section to the next stage section and from one stage to the next succeeding stage, an arrangement for resetting said stages comprising:

first and second metal oxide semiconductor field effect transistors, each having a first electrode, a second electrode, and a control electrode;

means for connecting the respective first electrodes of said first and second transistors to said first and second clock lines, respectively;

means for applying to the second electrode of each of said first and second transistors a level of potential which when applied to said clock lines results in the clocking of said stages so as to shift data therein; and means for applying a reset pulse to the control electrode of each of said first and second transistors to render said first and second transistors conductive of current to effectively apply said potential level to said first and second clock lines.

2. The arrangement as recited in claim 1 further including a third metal oxide semiconductor field effect transistor having a control electrode connected to the respective control electrodes of said first and second transistors, a first electrode connected to an input terminal of the first stage of said counter, and a second electrode connected to a power supply terminal.

3. In combination with a multistage counter circuit in which each stage includes a plurality of metal oxide semiconductor field effect transistors and first and second clock lines coupled to said transistors so that when a clock pulse is applied to said first clock line a selected one of said transistors is rendered conductive of current and when a clock pulse is applied to said second clock line a different one of said transistors is rendered conductive of current, a reset unit for resetting the stages of said circuit by the application of a selected potential level to said first and second clock lines, respectively, said unit comprising:

first, second and third metal oxide semiconductor field effect transistors, each having a first electrode, a second electrode and a control electrode;

the respective control electrodes of said first, second and third transistors being connected together; the first electrode of said first transistor being connected to said first clock line; the first electrode of said second transistor being connected to said second clock line; the first electrode of said third transistor being connected to an input terminal of the first stage of said circuit;

a source of potential having a first terminal connected to the respective second electrodes of said first and second transistors and having a second terminal connected to the second electrode of said third transistor; and means for applying a reset pulse between the interconnected control electrodes of said first, second and third transistors and said second terminal to render said first, second and third transistors conductive of current and thereby essentially apply the potential at said first terminal to said first and second clock lines and to essentially apply the potential at said second terminal to said first stage input terminal.